(12) United States Patent
Arend et al.

(10) Patent No.: US 8,176,436 B2
(45) Date of Patent: *May 8, 2012

(54) TEMPORARY COMMUNICATION AREAS FOR A COMPUTER USER INTERFACE

(75) Inventors: Udo Arend, Heidelberg (DE); Edmund Eberleh, St. Leon-Rot (DE); Heinz Willumeit, St. Leon-Rot (DE)

(73) Assignee: SAP Aktiengesellschaft, Walldorf (DE)

( * ) Notice: Subject to any disclaimer, the term of this patent is extended or adjusted under 35 U.S.C. 154(b) by 943 days.

This patent is subject to a terminal disclaimer.

(21) Appl. No.: 12/178,824

(22) Filed: Jul. 24, 2008

(65) Prior Publication Data

US 2008/0282170 A1    Nov. 13, 2008

Related U.S. Application Data

(63) Continuation of application No. 10/210,669, filed on Jul. 31, 2002, now Pat. No. 7,415,677.

(60) Provisional application No. 60/386,405, filed on Jun. 5, 2002.

(51) Int. Cl.
*G06F 3/048* (2006.01)
(52) U.S. Cl. ......................... 715/804; 715/733
(58) Field of Classification Search .................... 715/804
See application file for complete search history.

(56) References Cited

U.S. PATENT DOCUMENTS

| | | | |
|---|---|---|---|
| 5,581,243 A | 12/1996 | Ouellette et al. | |
| 5,623,681 A | 4/1997 | Rivette et al. | |
| 5,714,971 A | 2/1998 | Shalit et al. | |
| 5,736,984 A | 4/1998 | Jellinek et al. | |
| 5,760,773 A | 6/1998 | Berman et al. | |
| 5,784,060 A | 7/1998 | Betram et al. | |
| 5,786,809 A | 7/1998 | Ryzhov et al. | |
| 5,825,362 A | 10/1998 | Retter | |
| 6,014,135 A | 1/2000 | Fernandes | |
| 6,121,960 A | 9/2000 | Carroll et al. | |
| 6,130,665 A | 10/2000 | Ericsson | |
| 6,166,736 A | 12/2000 | Hugh | |
| 6,192,381 B1 | 2/2001 | Stiegemeier et al. | |
| 6,356,287 B1 | 3/2002 | Ruberry et al. | |
| 6,806,890 B2 | 10/2004 | Audleman et al. | |
| 6,990,638 B2 | 1/2006 | Barksdale et al. | |
| 7,111,240 B2 | 9/2006 | Crow et al. | |
| 2002/0047831 A1 | 4/2002 | Kim et al. | |
| 2002/0054141 A1 | 5/2002 | Yen et al. | |

(Continued)

OTHER PUBLICATIONS

ArtSKeyBoard for PPC Product Page; www.artsoft.ru/eng/artsbppc. htm; downloaded on Oct. 16, 2002, 1 pages.

(Continued)

*Primary Examiner* — Namitha Pillai
*Assistant Examiner* — Angie Badawi
(74) *Attorney, Agent, or Firm* — Fish & Richardson P.C.

(57) ABSTRACT

Techniques are disclosed for displaying information to a user on a display device of a computer system. In one general aspect, a first view is displayed on the display device, where the first view has at least a first work area. In response to the receipt of a first input received by the computer system, a second view is displayed on the display device. The second view includes the first work area and a temporary communication area, or "pop-in window," included within the first work area. The temporary communication area has a defined function associated therewith requiring input from a user. The temporary communication area may close after the user provides the necessary input and the defined function is performed.

10 Claims, 8 Drawing Sheets

U.S. PATENT DOCUMENTS

| | | |
|---|---|---|
| 2003/0061209 A1 | 3/2003 | Raboczi et al. |
| 2004/0104842 A1 | 6/2004 | Drury et al. |
| 2005/0041266 A1 | 2/2005 | Silverbrook et al. |
| 2005/0081159 A1 | 4/2005 | Gupta et al. |

OTHER PUBLICATIONS

Cooper, "Dialog Boxes," *About Face—The Essentials of User Interface Design*, Hungry Minds, Inc.(publisher), New York, NY, Chapter 21, pp. 299-318, 1995.

http://support.microsoft.com/defualt.aspx?scid=KB;EN-US:q177753&—"HowTo: Creating a Modal Dialog Box from Java," Microsoft Knowledge Base Article—Q177753, Microsoft Corp. 3 pages, 2002.

http://developer.apple.com/techpubs/mac/HIGudelines/HIGuidelines-131.1-html—"Modal Dialog Boxes (HI Guide)", Apple Computer, Inc., 3 pages, 1996.

http://developer.netscape.com/viewseurce/goodman_modal/goodman_modal.html—"Stimulating Modal Dialog Windows," by Danny Goodman, Netscape Communications Corporation, 9 pages, 1999.

Internet Store Product Listing for ArtSkeyboard from www.pdacentral.com/wince/preview/56915.html; downloaded from internet on Oct. 18, 2002; showing release date of Mar. 8, 2000; 2 pages.

Internet Store Product Listing for tWEEt-assistant from www.xt-infomatics.com/prod_twt.htm.; printed from website on Oct. 16, 2002; 2 pages.

Ryshov et al., "Dynamic virtual keyboard tWEEt® for Mobile Information Appliance," obtained at 222.xt-informatics.com/DL/art-twt.pdf on Oct. 16, 2002; document not dated; 4 pages.

"The API for the Fitaly Keyboard," obtained at www.fitaly.com/product/fitalapi.htm on Oct. 18, 2002; showing copyright dates of 1998-1999, 1 page.

"The Fitaly Keyboard for Windows CE," stated to have been last modified on Nov. 4, 2001; 7 pages.

"The Windows Interface Guidelines for Software Design" *Microsoft Press*, 1995, pp. 172-175; 344-346.

Microsoft Excel 2000 Screendumps, Copyright 1999, (Figs. 1-14).

FIG. 3

TEMPORARY COMMUNICATION AREAS FOR A COMPUTER USER INTERFACE

CROSS REFERENCE TO RELATED APPLICATIONS

This application claims priority from U.S. Utility application Ser. No. 10/210,669, filed Jul. 31, 2002, and titled "Temporary Communication Areas For A Computer User Interface," now U.S. Pat. No. 7,415,677, and U.S. Provisional Application No. 60/386,405, filed Jun. 5, 2002, and titled "User Interface with Temporary Communication Area," both of which are incorporated by reference in their entirety.

TECHNICAL FIELD

The invention relates to computer user interfaces.

BACKGROUND

A modal dialog box is a dialog box that, at the direction of a user interface program, pops up on a computer user's screen when the user is performing a particular function, and puts the user in a mode where the user is required to work only inside the dialog box. There are many different examples of modal dialog boxes. One example is when a user attempts to exit an electronic document after working on the document, a modal dialog box may pop up on the display asking the user whether the document has been saved to memory. The user is required to interact with this modal dialog box, by either selecting an option in the box that causes the document to be saved, or by selecting a cancel function that allows the document to be exited without being saved. In other examples, modal dialog boxes have an alert message that the user is forced to acknowledge by taking a specified action in the box.

The popping up of a modal dialog box on a user's display may obstruct the user's view of the primary workspace. In some cases, the user can drag the modal dialog box to another area of the screen to see the workspace below the box. In other cases, the modal dialog box cannot be dragged to another area of the screen, and the user must perform the function required by the modal dialog box before the workspace underneath can be seen again.

A modeless dialog box is one that also pops up on a user's screen, but unlike a modal dialog box, does not constrain the user to work only inside the dialog box. Like a modal dialog box, a modeless dialog box may cover up workspace on the display that the user may wish to continue to see. The user may thus be forced to take some type of action to see the workspace below. For example, the user may take an action that removes the modeless dialog box from the display, or that minimizes the box. Many users become irritated by having to take an action in response to a dialog box popping up on a screen and obscuring a portion of the workspace, in order to see the workspace again.

SUMMARY

The invention provides techniques for displaying information to a user on a display device of a computer system. In one general aspect, the invention provides for the display of a first view on the display device, where the first view has at least a first work area. In response to the receipt of a first input received by the computer system, a second view is displayed on the display device. The second view includes the first work area and a temporary communication area, or "pop-in window," included within the first work area. The temporary communication area has a defined function associated therewith requiring input from a user. The term "first view" is meant to describe the view appearing before an action initiating a pop-in window occurs.

In addition to the first work area of interest, the first view may comprise additional work areas. One or more of the additional work areas may be reduced in area to accommodate the inclusion of the temporary communication area in the second view without eliminating information appearing in the first work area. In some implementations, the first work area is split into two parts in the second view, and the temporary communication area is displayed between the two parts. In this case, the area of the first work area in the first view may equal the combined area of the two parts of the first work area in the second view. Also, the temporary communication area may be a modal dialog box upon which the user is required to act before proceeding with another function relating to the first work area. Alternatively, the temporary communication area is a modeless dialog box upon which the user is not required to act before proceeding with another function relating to the first area.

In some implementations, after the display of the second view with the temporary communication area and in response to the receipt of a second input by the computer system, the computer system performs the defined function. In addition, a third view may be displayed on the display device, including the first work area but not the temporary communication area. In other words, the temporary communication area may close after the user provides the necessary input and the defined function is performed.

In one embodiment, the first work area has a list of database objects, and the temporary communication area is a dialog box for creating an electronic communication to another user. The function to be performed, as defined by the dialog box, is a transfer to another user of an electronic communication with attached information from a selected object from the list of database objects. This electronic communication may be, for example, an electronic mail (email) message or a facsimile message sent from a computer.

In another embodiment, a temporary communication area is provided in the first workspace when a user input is determined to correspond to a plurality of potential inputs. The function to be performed as defined by the temporary communication area is a selection of one of the plurality of potential inputs. The temporary communication area may identify the plurality of potential inputs to allow the user to select among the plurality of potential inputs. These potential inputs may be identified, for example, in a multiple-choice drop-down list, enabling the user to choose among the plurality of potential inputs. After one of the potential inputs has been selected, a third view may be displayed, comprising the first work area with the selected input displayed in the first work area. In addition, the third view does not include the temporary communication area in the first work area.

Advantages of the invention may include one or more of the following. Entire new classes of dialog box designs are possible, some being modal, and others, modeless. For example, a modal dialog box incorporating the invention is, in some respects, less restrictive, and as such, may be suitable for additional applications where a modal dialog box of the pop up variety would be unsuitable. A dialog box is presented on a user interface without obscuring information on the user interface, as is the case with a separate dialog box that pops up in front of the work area of interest. In some cases, the elimination of a separate dialog box eliminates difficulties of communication between the separate windows. This is the case, for example, in browser-based applications using the HyperText Transport Protocol (HTTP).

In other embodiments, the temporary communication area includes at least one input field and one function button, and selection of the function button initiates performance of the defined function. The temporary communication area includes a message to the user, in which case the defined function may be a user acknowledging the message, for example, by clicking a "cancel" button on the temporary communication area.

In another embodiment, the temporary communication area is a wizard, where a series of dialog views is presented to the user. The user may enter an input or inputs in each of the views, and successive views may depend upon the inputs entered in previous views.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2-3 are screen snapshots of a computer display in accordance with an embodiment of the invention;

Like reference symbols in the various drawings indicate like elements.

DETAILED DESCRIPTION

Figure 1:
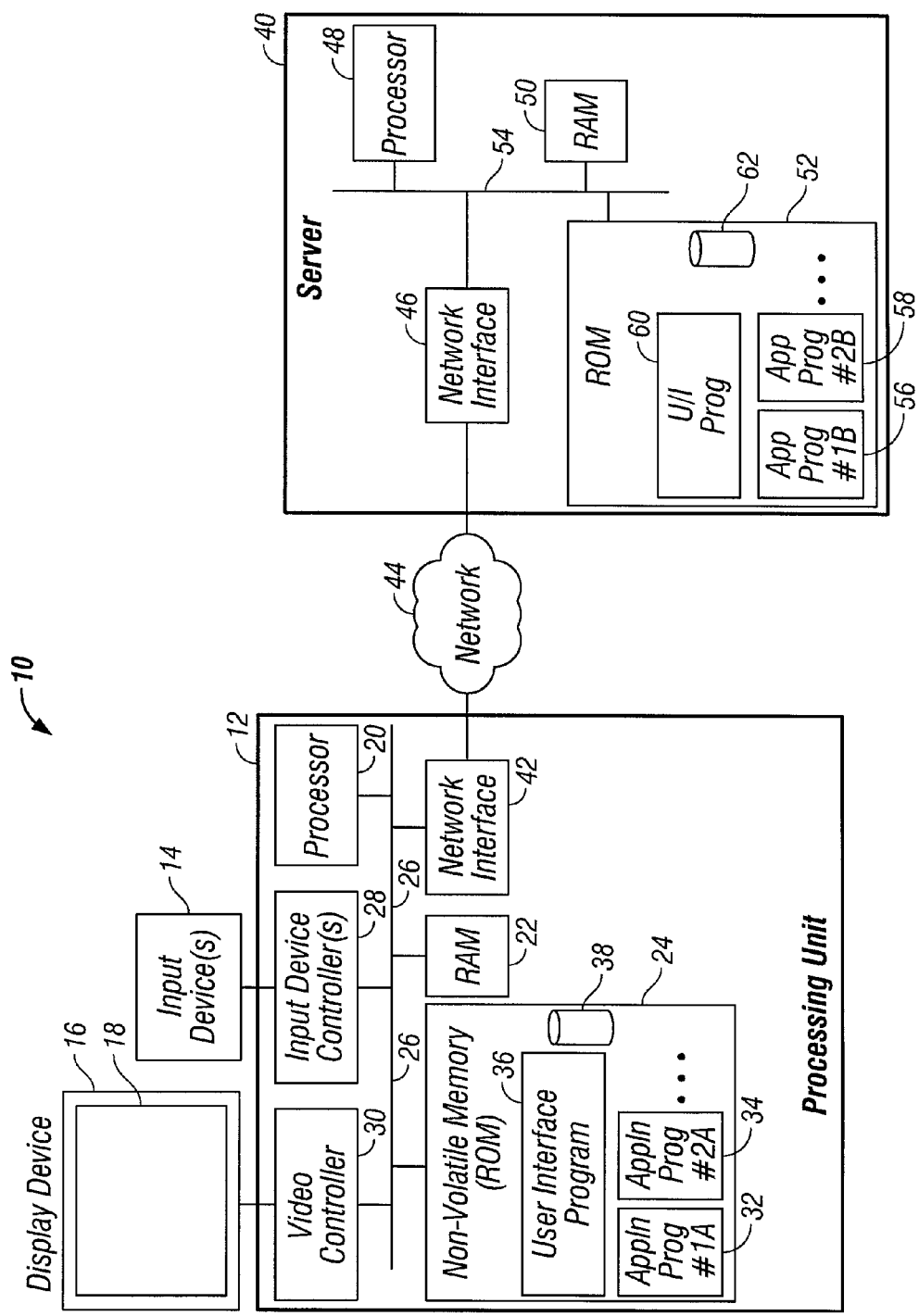
FIG. 1 is a block diagram of a system that may utilize aspects of the invention.

A computer system 10, shown in FIG. 1, includes a processing unit 12, one or more input devices 14, and a display device 16 upon which a user is presented displays in accordance with the invention. The display device 16 has a video screen 18 upon which displays appear.

As is conventional, the processing unit 12 includes a processor 20, random access memory (RAM) 22, and read-only memory (ROM) 24, all interconnected by a data bus 26. Input device controllers 28, also connected to the data bus 26, receive command signals from input devices 14 and forward the command signals in the appropriate format for processing. A video controller 30, connected to the data bus 26, receives video command signals from the data bus 26 and generates the appropriate video signals that are forwarded to the display device 16 so that the desired display is provided on the screen 18.

ROM 24, as is conventional, provides non-volatile data storage for various application programs. In the example shown in FIG. 1, a number of different application programs 32, 34, etc., are stored in ROM 24. Also stored in ROM 24 is a user interface program 36 designed to work in concert with each of the application programs 32, 34, etc. This is conceptually depicted in FIG. 1 by the user interface program 36 being shown as a layer on top of the application programs 32, 34, etc. With such a design, user interface program modules common to several application programs need not be duplicated in each of the application programs. In addition, such a design may enable a common "look-and-feel" to the user interface for the different program applications 32, 34, etc. In other implementations, the user interface program, or module, need not be a common program or module for more than one program application.

As is conventional, programs 32, 34, and 36 have program instructions that may be loaded into RAM 22 during operation. Processor 20 then executes the program instructions, as required, to perform desired program functions.

Also stored in ROM 24 are various data in database 38. Database 38 includes data needed or generated during operation of the application programs 32, 34, etc. In the FIG. 1 implementation, a single database 38 is shown that serves as a common database for all applications 32, 34, etc. In other implementations, there may be separate databases for one, or more, of the applications 32, 34, etc.

Also shown in FIG. 1 is server 40. The computer system 10 has a network interface 42, connected to its data bus 26. As such, computer system 10 may access server 40 via network 44 to run applications residing on the server 40. As is conventional, the server 40 includes a network interface 46, a processor 48, RAM 50, and ROM 52, all interconnected by a data bus 54. The server's network interface 46 provides the connection to network 44 so that client computer systems, such as system 10, can access the server 40. In similar fashion to computer system 10, the server ROM 52 includes various different application programs 56, 58, etc., as well as a common user interface program 60 for the application programs 56, 58, etc. ROM 52, in this example, also includes data stored in database 62, although in other implementations a separate database server may be required.

The invention will be described in the context of a program application for customer relationship management (CRM). A CRM program application manages all of the interactions a company may have with its customers, for example, marketing, sales, and service functions. In one implementation, the CRM application program is made up of several different application program modules, some of which reside on a client computer, such as system 10, while others reside on a central server, such as server 40. CRM functions typically require access to, and generate, a large amount of data that is stored in various databases on a client or server. Some examples of data include customer and product information, marketing statistics, and service information, to give just a few examples.

Figure 2:
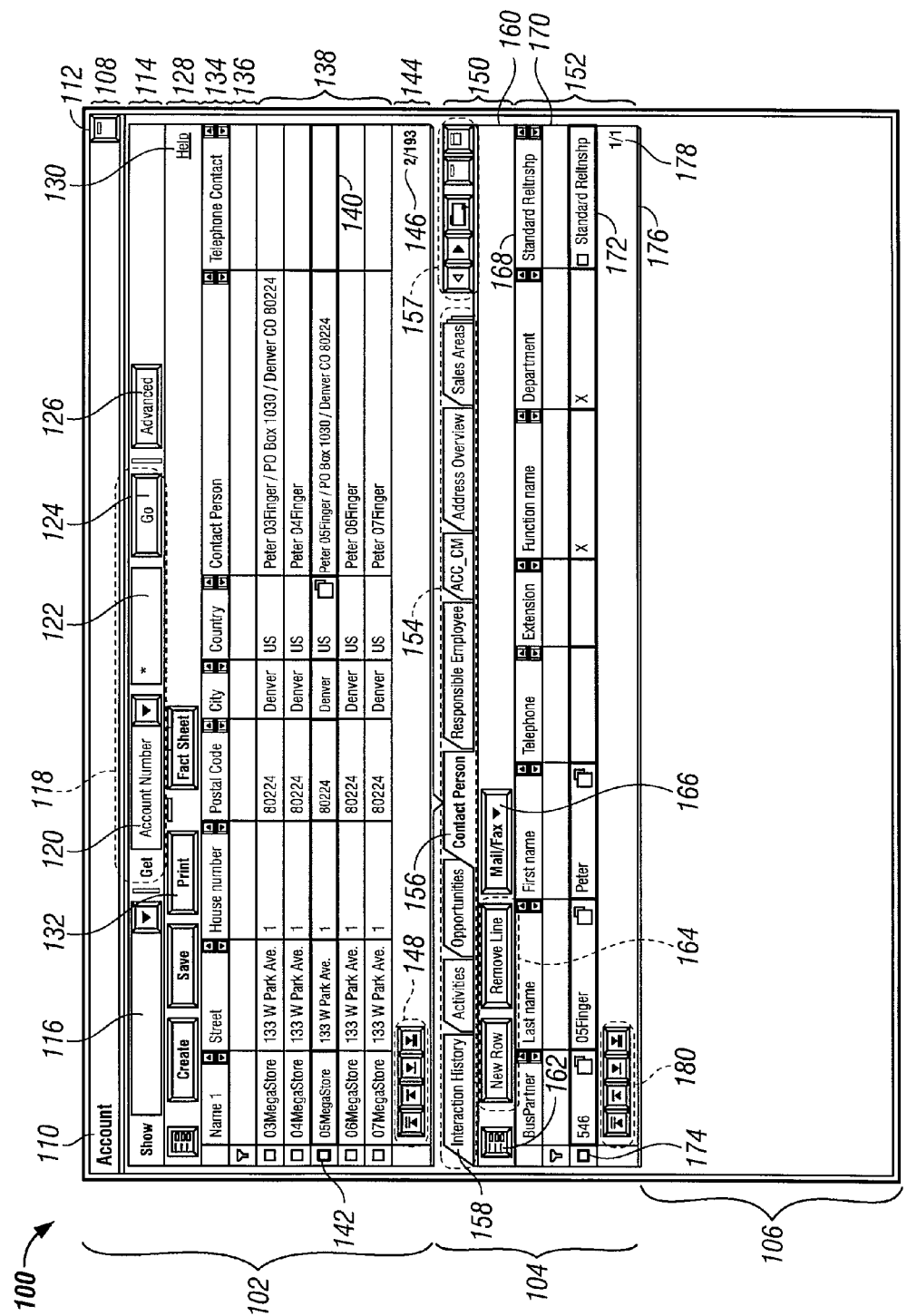

FIG. 2 shows an example display 100 that may be presented, on screen 18 shown in FIG. 1, to a user of a CRM application program. In this example, the user is using the program to email contact information, perhaps to a co-worker. The user may wish to email this information, for example, because the user has collected this information on his own computer system, and the information is not yet available in a central database.

For discussion purposes, the display 100 may be divided into three areas, a top area 102, a middle area 104, and a bottom area 106. In the FIG. 2 display 100, the top area 102 takes up roughly the upper thirty percent of display 100, the middle area 104 the next twenty percent, and the bottom area 106 the bottom fifty percent.

Generally, the top area 102 allows the user to define and select query criteria for purposes of searching the database 62 (FIG. 1) for objects, and presents the objects to the user in a content area 138 following the execution of the database search. An object is a collection of data, organized as a group of fields, where each field may contain a data entry that provides information pertaining to the object. Objects may be stored in a database, such as database 62, for access by users via networked computer systems, such as computer system 10. The middle area 104 provides an area where the user may work with an object or objects identified in the top area 102. Additional detail pertaining to the object(s) is available here, as well as, perhaps, the capability of performing specific tasks or functions that utilize the object information. The bottom area 106, in this example, is additional space for one or more other work areas.

Beginning with the top area 102, a title row 108, located along the upper edge of area 102, contains the display title 110 ("Account" in this example), and a minimization button 112 that the user may select to minimize the display area 102. In this example, the user knows he is viewing account information in this display 100 because of the display title 110. The title row 108 may contain a different title and other (including a different number of) buttons in other embodiments.

A search bar 114, located below the title bar 108, provides three database query mechanisms the user may employ to search for, and identify, objects stored in the database 62. The first mechanism, located at the left side of the search bar 114, is a "Show" mechanism 116, containing a list with a selection of predefined queries allowing the user to retrieve collections of objects using previously defined query patterns.

The second mechanism, positioned to the right of the "Show" mechanism 116, is a search tool 118. The search tool 118 has three parts: 1) a "Get" list 120, located just right of the "Show" mechanism 116, for selecting an object field label, 2) a string entry field 122, positioned right of the "Get" list 120, for providing a search string, and 3) a "Go" button 124, located right of the string entry field 122, for initiating the query. The user would select the "Go" button 124 after choosing a field label from the "Get" list 120, and providing a search string in the search field 122. The third mechanism is an "Advanced" search button 126, positioned to the right of the "Go" button 124, which allows the user to define advanced query criteria for searching the database 62. This is the mechanism that the user would employ if neither the first 116 nor the second 118 query mechanism met his needs.

Moving to the next row in display area 102, there is a toolbar 128. The toolbar 128 is an area, displayed as a row, located below the search bar 114 and, in this example, contains a "Help" icon 130 on its right side, and a group of buttons 132 on its left side. The "Help" icon 130, as is conventional, provides the user with assistance when selected. The group of buttons 132, when selected, cause actions to occur that affect the content area 138, for example, to display a selected object's detailed information, to create a new object, to save changes made to an object, to print an object's information, or to display a fact sheet pertaining to an object. The toolbar 128 may contain other (including a different number of) buttons in other embodiments.

A column label row 134, located just below the toolbar 128, provides labels identifying the field names for each of the columns in a list of objects 138. In this example, the column labels are "Name 1", "Street", "House Number", "Postal Code", "City", "Country", "Contact Person", and "Telephone Contact". A filter row 136, located immediately below the row of column labels 134, is displayed as a blank row partitioned into sections by the columns of the list of objects, and has a button located near its left edge. The filter row 136 allows the user to filter (sort according to a particular condition and display only those objects satisfying the condition) the list of objects.

A list of business objects 138 is comprised of a collection of business objects, where each individual business object is displayed as a row in the list. The list of business objects 138 is located below the filter row 136, and in this example, five business objects are shown. Each individual business object is comprised of several fields, each capable of storing information pertaining to the business object, which are separated from one another by vertical lines representing the columns of the list of business objects 138. Thus, field entries in like columns of the list belong to the same field category, denoted by the field label located at the top of the particular column in the row of column labels 134. In this example, the five business objects 138 displayed in the top area 102 contain information on five business accounts, each representing a different department within MegaStore, located at 133 W. Park Ave. in Denver, with Peter Finger being the contact person for each of the departments.

The user may select individual business objects when information pertaining to a particular business object is of interest, for example, or prior to requesting a function be performed that will require a selected business object as one of its parameters. In this example, the third business object 140, located in the middle row of the list of business objects 138, is selected. This can be seen by noting that the business object selection icon 142 of the third business object 140, a square icon located near the left edge of the selected business object 140, is highlighted. The user selects a business object by selecting the business object selection icon in a similar manner as selecting a button (for example, positioning the cursor over the business object selection icon using a mouse and clicking the button of the mouse). An information display row 144, located along the bottom of the display area 102 below the list of business objects 138, contains a page number indicator 146 on its right side (page 2 of 193 in this example, indicating that there are 193 pages of business objects, and that currently page 2 is displayed), and a group of buttons 148 for navigating between pages, for example by going backward or forward by one page, or by jumping to the first or last page, on its left side.

Now moving to the middle area 104, located below the top area 102, there is an area where more detailed information is presented on the selected business object 140 from the top area 102. Display area 104 can be broken, generally, into two sections, a command section 150, and a content section 152, located below the command section 150. Looking first at the command section 150, a row of tabs 154, located along the top of command section 150, permit the user to select between different types of field information pertaining to the object displayed in the content section 152, depending upon which tab is active. In this example, the "Contact Person" tab 156 is active, as seen by the darker shading of the "Contact Person" tab relative to the non-active tabs in the row of tabs 154. Because the "Contact Person" tab 156 is active, the information presented in the content section 152 will describe in further detail the contact person of the selected business object 140 from area 102. This is the person that the user would work with, at least initially, when any dealings or issues with the department identified by the selected business object 140 (05 MegaStore in this example) were required. As another example, if one of the non-selected tabs (such as "Interaction History" 158, for example) were selected instead, the information displayed in the content section 152 would be a different set of fields for the same object 140. They might include the date of initial contact with 05 MegaStore, the date of the first sale to 05 MegaStore, or the date of the last transaction with 05 MegaStore, to name just a few possibilities.

A group of buttons 157 is located along the top of the command section 150, to the right of the row of tabs 154. The first three buttons, when selected, alter the presentation of tabs in the row of tabs 154, for example, by scrolling the tab row 154 one position to the left or right and displaying a previously hidden tab, or by presenting an entirely new set of tabs in the tab row 154 for this particular business object. The last two buttons affect the appearance of display area 104, when selected, by minimizing or maximizing the size of the area 104, for example.

A toolbar 160 is located immediately below the row of tabs 154 and the group of buttons 157, within the command section 150. The toolbar 160 is an area, displayed as a row, which may contain one or more buttons that cause functions to be performed when selected by the user. In this example, the toolbar 160 contains four buttons. The first button 162, located at the left edge of the toolbar 160, displayed as a white square with several dark lines within the square, alters the appearance of the content section 152 of display area 104, for example, by displaying the object in a format showing additional fields and labels, instead of as a row (as shown in this example). The next two buttons 164 are located just to the right of the first button 162. They have the labels "New Row", and "Remove Line", respectively, on them, and are buttons that the user would select to add a row or remove a selected row from the content section 152.

Finally, a "Mail/Fax" button 166, located just to the right of the "New Row" and "Remove Line" buttons 164, has the label "Mail/Fax" on it. The user would select this button 166 to initiate the sending of an email or fax with contents pertaining to an object that the user has selected from the content section 152. The user would choose between email and fax by selecting one or the other as a choice from a list that would appear after selecting the "Mail/Fax" button 166. The toolbar 160 may contain other (including a different number of) buttons in other embodiments of the invention.

Moving now to the content section 152, the area where data associated with the selected tab ("Contact Person" 156 in this example) is displayed. A row of column labels 168, located below the toolbar 160, and a filter row 170 below the row of column labels 168, serve the same purpose for display area 104 as the corresponding row of column labels 134 and filter row 136 did for display area 102. In this example, the individual labels in the row of column labels 168 differ from those in row 134 because the fields of information displayed in area 104 differ from those displayed in area 102.

The displayed information in the content section 152 is a business sub-object 172 of the selected business object 140 from area 102, displayed as a row below the filter row 170. A business sub-object (for example, sub-object 172) contains detailed and specific information pertaining to its parent business object (business object 140 in this example). As with the business objects from area 102, the business sub-object 172 is comprised of several fields, and has a selection icon 174, located near its left edge, which in this example is selected. In the alternative example described above, the user selecting the "Interaction History" tab 158 from the row of tabs 154 would cause a new business sub-object, with information pertaining to interaction history for business object 140, to be displayed in the area where business sub-object 172 is currently displayed. A display information row 176 for the content section 152, located below business sub-object 172, fills out the remainder of display area 104 and contains a page number indicator 178 on its right side (page 1 of 1 in this example), and a group of buttons 180 for navigating between pages, for example by going backward or forward by one page, or by jumping to the first or last page, on its left side.

Figure 3:
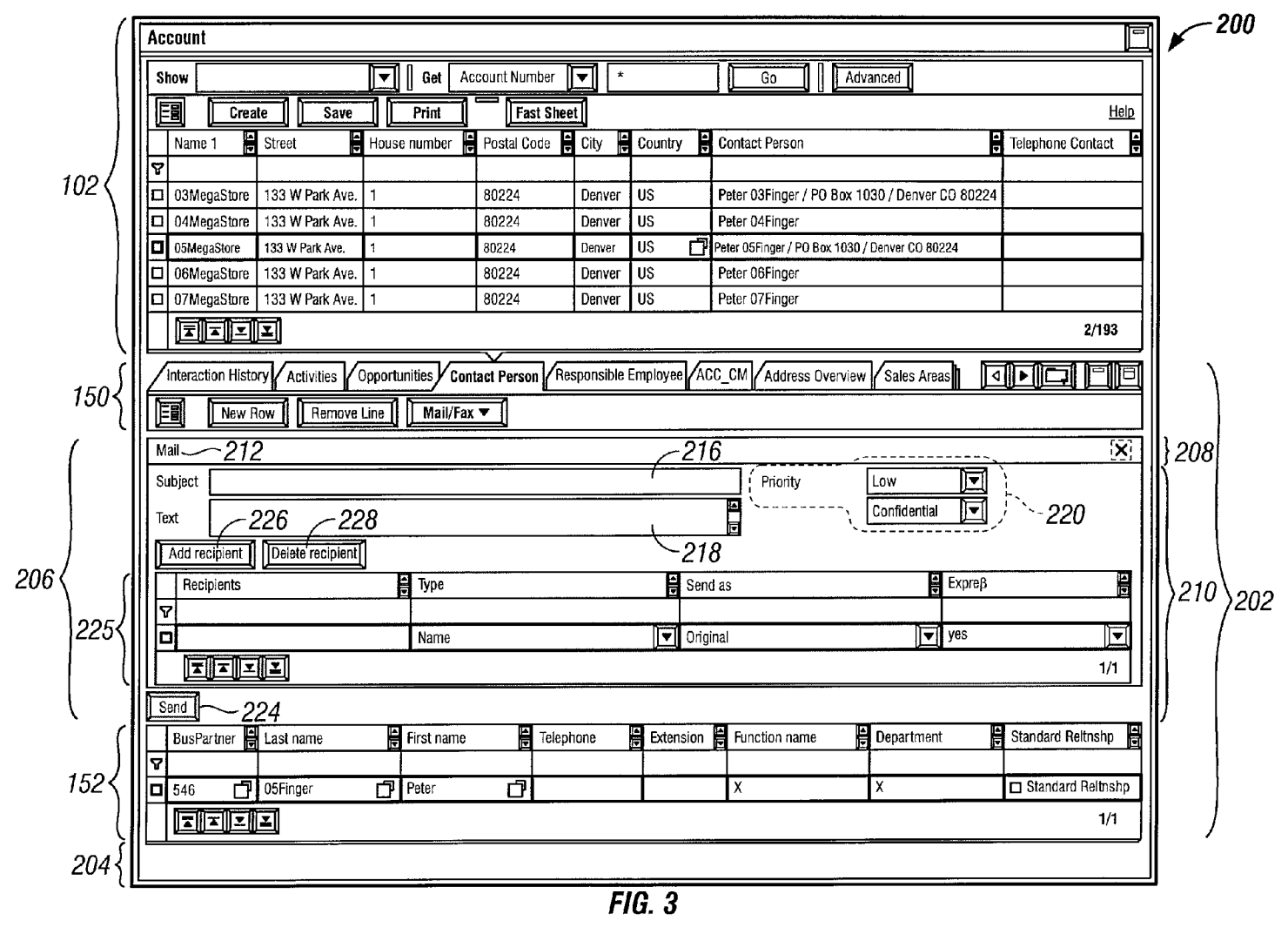

Now, consider that the user wishes to send the information contained in the fields of a business sub-object via email to another person. First, the user would select the appropriate business sub-object (e.g. business sub-object 172 in this example). Next, the user would select the "Mail/Fax" button 166. This action would cause the user interface to create a temporary communication area, or pop-in window, within the display 100 shown in FIG. 2, to prompt the user for the name and email address of the intended email recipient, as well as the subject, text, and priority level of the email. FIG. 3 shows the resulting display 200 created by the user interface.

The FIG. 3 display 200 includes, in middle display area 202, a pop-in window 206. The top area 102 of display 200 is unchanged from the display 100 shown in FIG. 2, and takes up roughly the upper thirty percent of display 200. The enlarged middle area 202 with the pop-in window 206 takes up the next fifty percent. The bottom area 204 is reduced from the previous display 100 shown in FIG. 2, and now takes up only the bottom twenty percent. This is to accommodate the included pop-in window 206. In the FIG. 3 display 200, the top area 102 is unchanged from the top area 102 of the previous display 100 shown in FIG. 2. The bottom area 204, located at the bottom of the display view 200, contains the same information as the bottom display area 106 from the previous display 100 of FIG. 2, although it occupies less space in the present display 200 because the middle display area 202 of display 200 has been expanded (compared to the middle display area 104 of FIG. 2) to create room for the temporary communication area 206, thus leaving less space available below it within the display 200 for the bottom display area 204.

The middle display area 202 contains the command section 150 and the content section 152 from the relevant display area 104 of FIG. 2 (the display area where the user had selected the "Mail/Fax" button 166 in this example), and the new temporary communication area 206. The command section 150, located at the top of display area 202, is as described above in the discussion of FIG. 2. The content section 152 is located at the bottom of display area 202. Although no longer directly below the command section 150 (as was the content section 152 in FIG. 2), the content section 152 is otherwise as described above in the discussion of FIG. 2.

The temporary communication area 206, located between the command section 150 and the content section 152 of display area 202, provides a convenient way for the user to enter information required by the user interface to perform a function (send an email in this example). The resulting display is uncluttered, while still displaying all of the necessary information of interest to the user without opening new windows. Additionally, because the temporary communication area 206 is located near the area of the previous user action (the "Mail/Fax" button 166 in this example), the user is easily able to recognize the cause and effect relationship between the previous action and the temporary communication area 206. This compares with pop-up windows, which are separate, secondary windows that "pop-up" on a display. Pop-up windows usually appear in the center of the display area, regardless of where on the display the action was taken that preceded the pop-up window appearance, and perhaps covering up a portion of the primary window and hiding display information underneath, as well as perhaps being distracting to the user due to the creation of another distinct window that requires user attention.

In this embodiment, the temporary communication area 206 contains a title bar 208, and a temporary communication area body 210. The title bar 208 is located along the top of the temporary communication area 206. The title bar 208 is displayed as a row and identifies the type of temporary communication area 206 by a label 212, located at the left side of the title bar 208. Because the purpose of this temporary communication area 206 is to gather information for sending an email, the label 212 in this embodiment is "Mail". A close button 214, depicted as a button with an 'X' on it and located near the right edge of the title bar 208, permits the user to immediately close the temporary communication area 206, when selected. The events that occur when a temporary communication area is closed will be discussed later.

The temporary communication area body 210 occupies the remaining space in the temporary communication area 206. This is the location within the temporary communication area where the main purpose or function of the temporary communication area is presented or carried out. In this embodiment, the temporary communication area body 210 contains two input fields 216 and 218 with labels "Subject" and "Text," a pair of input selection boxes 220 for selecting priority level and confidentiality level, an email recipient specification section 222, and a button 224 for performing the email send function.

Input field "Subject" 216 and its associated label are located in the upper left corner of the temporary communication area body 210. The label ("Subject") is positioned to the left of the input field and in this example indicates that the user should enter, in field 216, the subject of the email. Input field "Text" 218 and its associated label are located below the "Subject" input field 216. Similarly, the label ("Text") is positioned to the left of the input field and in this example indicates that the user should enter the text of the email in field 218.

To enter textual data in an input field displayed within a display view, the user may move the cursor, controlled by a pointing device (for example a mouse), over the desired input field and initiate an input (for example, by clicking a button of the mouse). This action will cause the user interface to display a text entering indicator (for example a blinking vertical line, not shown) within the input field, informing that the user may begin inputting data to the input field (for example, by typing a key or sequence of keys on an input device such as a keyboard), after which the user interface will display the entered input in the input field.

Next, the a pair of input selection boxes 220 for selecting priority level and confidentiality level are located in the upper right corner of the temporary communication area body 210, to the right of the "Subject" 216 and "Text" 218 input fields. They permit the user to select a priority level ("Low" or "High", for example), and a confidentiality level ("Confidential" or "Open", for example) for the email.

The email recipient specification section 222, located below the "Text" input field 218 and the pair of input selection boxes 220, allows the user to specify the recipients of the email. A list of email recipients 225, at the bottom of the email recipient specification section 222, may display potential recipients. The user adds a recipient to the list 225 by selecting the "Add recipient" button 226, located at the top left corner of the email recipient specification section 222, and deletes a selected recipient from the list by selecting the "Delete recipient" button 228, located just to the right of the "Add recipient" button 226.

Finally, the "Send" button 224, located in the lower left corner of the temporary communication area body 210, is labeled "Send". It is the button 224 that the user selects when finished entering the subject and text in fields 216 and 218, the priority and confidentiality levels in selection boxes 220, and specifying the intended email recipients in section 222, and wishes to send the email.

The action of the user selecting the "Send" button 224 causes an email to be sent to the selected email recipients in the email recipient specification section 222. The contents of the email include the field information pertaining to the selected business sub-object 172 from content area 152.

Additionally, in this embodiment, the user interface will close the temporary communication area 206 after selection of the "Send" button 224 because the purpose of the temporary communication area 206 has been accomplished.

In this embodiment, the user interface will close the temporary communication area 206 when the user either selects the "Send" button 224, or selects the close button 214. When either event happens, the next view displayed by the user interface may be a display view identical to the display 100 of FIG. 2.

Figure 4:
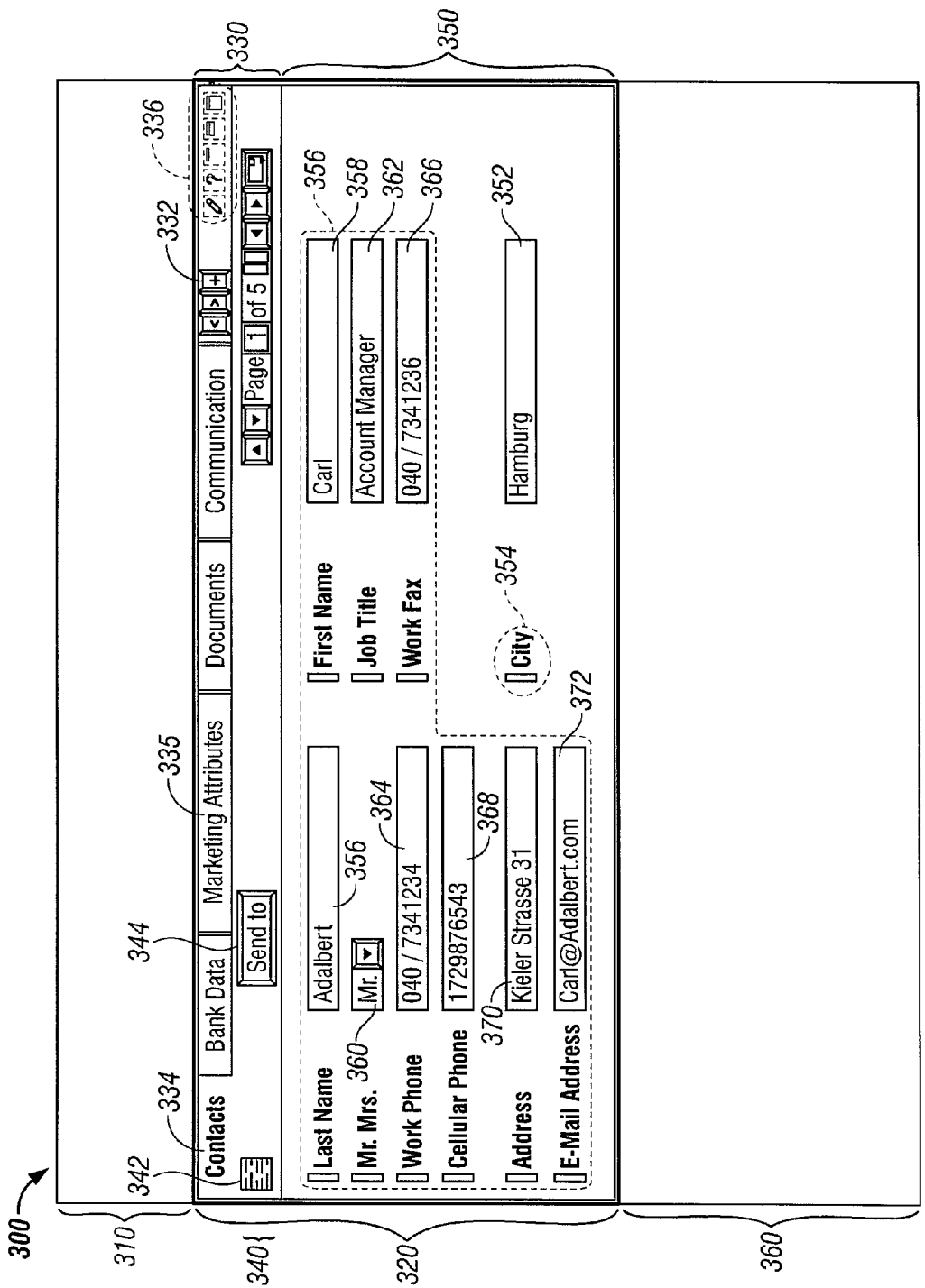
FIGS. 4-6 are screen snapshots of a computer display in accordance with another embodiment of the invention.
Figure 5:
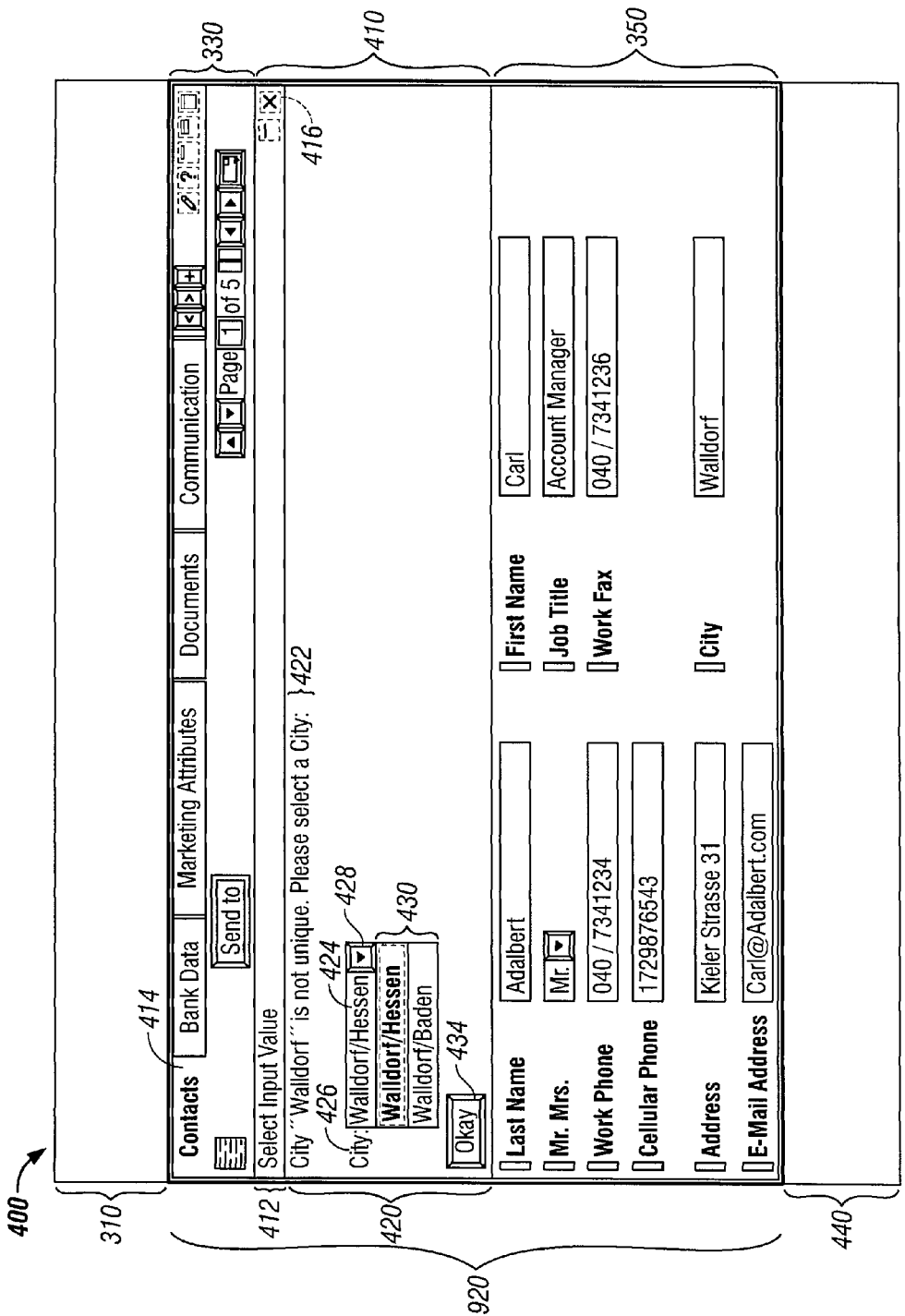
Figure 6:
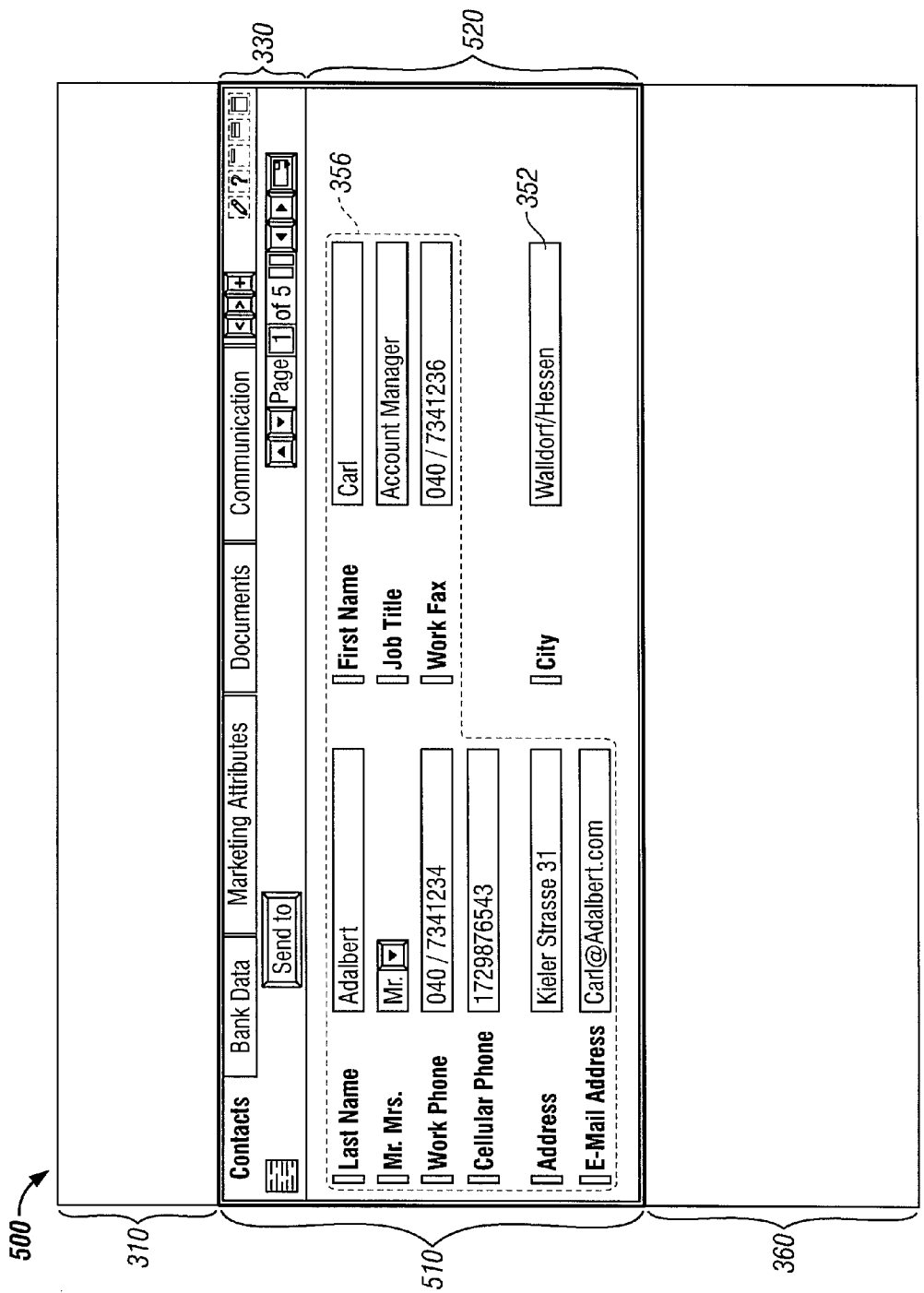

Another example of where a pop-in window is useful is shown in FIGS. 4-6. In this example, a user has entered textual data in an input field, where for some reason the input was ambiguous. In this scenario, the user interface might display a temporary communication area informing the user that the entered input is not unique, and present the user with a multiple-choice list of acceptable (non-ambiguous) input choices. The user could then select a choice from the multiple-choice list of acceptable input choices and the user interface would update the associated input field with the selected choice, thereby resolving the ambiguity.

FIG. 4 shows an example display 300 that may be presented, on screen 18 shown in FIG. 1, to a user of a CRM application program. In this example, the user is using the program to update a field entry in a business object. This display view 300 provides the user with detailed business object information associated with a single business object, as opposed to more general information on several business objects.

For discussion purposes, display 300 may be viewed as being made up of three areas, a top area 310, a middle area 320, and a bottom area 360. In the FIG. 4 display 300, the top area 310 takes up roughly the upper thirty percent of the display 300, the middle area 320 the next thirty percent, and the bottom area 360 the bottom forty percent. Generally, in this example, the top area 310 is located at the top of the display view 300 and serves as a work area. Likewise, the bottom area 360 is located at the bottom of the display 300, and serves also as a work area.

The middle display area 320, located between the top area 310 and the bottom area 360, can be broken, generally, into two sections: 1) a command section 330 and, 2) a content section 350, located below the command section 330. Looking first at the command section 330 of display area 320, a row of tabs 332, located along the top of the command section 330, permit the user to select between different types of field information pertaining to the business object displayed within the content section 350 of display 320, depending upon which tab is active. In this example, the "Contacts" tab 334 is active, as seen by the darker shading of the "Contacts" tab 334 relative to the non-active tabs in the row of tabs 332. Because the "Contacts" tab 334 is active, the detailed information displayed in the content section 350 is the business object fields describing the contact information for this particular business object. As another example, if one of the non-selected tabs (such as "Marketing Attributes" 335, for example) were selected instead, the detailed information displayed in the content section 350 would be a different set of business object fields for this business object. They might include the number of employees in the marketing department, the marketing department's advertising budget, and the schedule of upcoming trade show appearances, to give just a few possibilities.

A group of buttons 336 is located along the top of the command section 330, to the right of the row of tabs 332. These buttons affect the appearance of the display area 320, when selected, by minimizing or maximizing the size of the display area 320, for example. A toolbar 340 is located immediately below the row of tabs 332 and the group of buttons 336, within the command section 330. The toolbar 340 is an area, displayed as a row, which may contain one or more buttons that cause functions to be performed when selected by the user.

In this example, the toolbar 340 contains two buttons. The first button 342, located at the left edge of the toolbar 340, displayed as a white square with several lines within the square, alters the appearance of the content section 350 of display area 320, for example, by displaying the object in a row format showing each field in a column within the row. The next button 344, located to the right of button 342, is the "Send to" button 344. This button has the label "Send to" on it, and is the button 342 that the user would select to initiate the sending of an email with contents pertaining to the displayed business object from the content section 350. The toolbar 340 may contain other (including a different number of) buttons in other embodiments of the invention.

Moving now to the content section 350, there is an area where the detailed information associated with the selected tab ("Contacts" 334 in this example) is displayed. The information is displayed as a collection of business object fields and associated business object field labels, each business object field capable of holding a field entry.

A "City" business object field 352 and associated business object field label 354 are located in the lower right corner of the content section 350. The business object field label 354 appears to the left of the associated business object field 352, and consists of a vertical bar and the name "City" to the right of the vertical bar. This label informs the user that the business object field entry in field 352 should be the name of the appropriate city for this business object's contact. The field entry in the "City" field 352 is "Hamburg" in this example.

The remaining collection of business object fields and field labels 356, located in the content section 350 of the display area 320, together with the respective entries in the fields, comprise the remaining detailed contact information for the business object. In this example, those fields are the "Last Name" 356, "First Name" 358, "Mr. Mrs." 360, "Job Title" 362, "Work Phone" 364, "Work Fax" 366, "Cellular Phone" 368, "Address" 370, and "E-Mail Address" 372 fields, along with their respective field entries. In this example, the "Last Name" 356, "Mr. Mrs." 360, "Work Phone" 364, "Cellular Phone" 368, "Address" 370, and "E-Mail Address" 372 fields are located, top to bottom, along the left side of the content section 350. The "First Name" 358, "Job Title" 362, and "Work Fax" 366 fields are located, starting from the top, along the right side of the content section 350.

Now, consider that the user wishes to change the entry in the "City" 352 business object field (for example, from "Hamburg" to "Walldorf"). First, the user would select the "City" 352 field, and then type "Walldorf." If the user's entry is ambiguous (for example, if the acceptable city names beginning with Walldorf are Walldorf/Hessen, and Walldorf/Baden), the ambiguity may be recognized and the user interface may open a temporary communication area, or pop-in window, within the display 300 shown in FIG. 4, informing the user of the ambiguity and offering the user a list of acceptable choices via a multiple-choice list. FIG. 5 shows the resulting display 400 created by the user interface.

The FIG. 5 display 400 includes, in the middle display area 420, a pop-in window 410. In the FIG. 5 display 400, the top area 310 takes up roughly the upper thirty percent of display 200, the middle area 420 the next fifty percent, and the bottom area 440 the bottom twenty percent. In the FIG. 5 display 400, the top area 310 is unchanged from top area 310 in the previous display 300 shown in FIG. 4. The bottom area 440, located at the bottom of the display 400, contains the same information as the lower display area 360 from the previous display 300 of FIG. 4, although it occupies less space in the present display 400 because the middle display area 420 of display 400 has been expanded (compared to the middle display area 320 of FIG. 4) to create room for the temporary communication area 410, thus leaving less space available below it within the display 400 for the lower display area 440.

The middle display area 420, located between the top display area 310 and the bottom display area 440, contains the command section 330 and the content section 350 from the relevant display area 320 of FIG. 4 (the display area where the user had entered the ambiguous field entry in this example), and the new temporary communication area 410. The command section 330, located at the top of display area 420, is the same as in the display 300 in FIG. 4. The content section 350 is located at the bottom of display area 420. Although no longer directly beneath the command section 330 (as was the content section 350 in FIG. 4), the content section 350 is otherwise as described above in the discussion of FIG. 4.

The temporary communication area 410, located between the command section 330 and the content section 350, provides a convenient way for the user to resolve the ambiguity of the input entered ("Walldorf" in this example) in the previous display 300. In this embodiment, the temporary communication area 410 contains a title bar 412 and a temporary communication area body 420. The title bar 412 is located along the top of the temporary communication area 410. The title bar 412 is displayed as a row and identifies the type of temporary communication area 410 by a label 414, located at the left side of the title bar 412. Because the action of the user entering an ambiguous entry in an input field ("Walldorf" in the "City" field 352 in this example) was the precursor leading to the display of this temporary communication area 410, the label 414 in this embodiment is "Select Input Value". A close button 416, depicted as a button with an 'X' on it and located near the right edge of the title bar 412, permits the user to immediately close the temporary communication area 410, when selected.

The temporary communication area body 420 occupies the remaining space in the temporary communication area 410. In this embodiment, the temporary communication area body 420 contains a text message 422, an input field 424 with label 426, a multiple-choice list button 428 that prompts a multiple-choice list 430 to be displayed, when selected, and a button 434 for saving the choice.

The text message 422, located in the upper left corner of the temporary communication area body 420, informs the user that the input entry was not unique and suggests that the user select a more appropriate input choice. The text of the message is "City 'Walldorf' is not unique. Please select a city:", in this example. The "City" input field 424 with a multiple-choice list 430 is located beneath the text message 422 in the temporary communication area body 420. The input field label 426 ("City" in this example) is located to the left of input field 424, and a multiple-choice list button 428 is located to the right of input field 424. The multiple-choice list button 428 has a dark arrow in the shape of a triangle pointing downward on it, informing the user that a multiple-choice list containing input choices will appear when the button 428 is selected. The multiple-choice list 430 appears as a list of choices in rows, arranged vertically, one per row, below the input field 424 and the multiple-choice list button 428, after the multiple-choice list button 428 is selected. In this example, the multiple-choice list 430 consists of two choices, "Walldorf/Hessen", and "Walldorf/Baden."

The user may then select one of the choices from the list 430. To select a choice from a multiple-choice list 430 of input field choices, the user may move the cursor, controlled by a pointing device (for example a mouse), over the desired choice (for example, "Walldorf/Hessen") in the multiple-choice list and initiate an input (for example, by clicking a button of the mouse), after which the user interface will update the input field 424 with the chosen selection. After this action is taken, the multiple-choice list 430 will no longer be shown by the user interface and the input field 424 will contain the selected choice ("Walldorf/Hessen" in this example).

The "Okay" button 434, located in the lower left corner of the temporary communication area body 420, is labeled "Okay". It is the button 434 that the user selects when finished selecting a choice from the multiple-choice list 430, and wishes to save the choice. The action of the user selecting the "Okay" button 434 causes the "City" field 352 from the content section 350 to be updated and contain the new value "Walldorf/Hessen", in this example. Additionally, in this embodiment, the user interface will close the temporary communication area 410 after selection of the "Okay" button 434, because the purpose of the temporary communication area 410 has been accomplished.

In this embodiment, the user interface will close the temporary communication area 410 when the user either selects the "Okay" button 434, or selects the close button 416. When either event happens, the next view displayed by the user interface may be the display view 500 shown in FIG. 6.

Referring to FIG. 6, a display 500 is shown. For discussion purposes, display 500 may be viewed as being made up of three areas, a top area 310, a middle area 510, and a bottom area 360. In the FIG. 6 display 500, the top area 310 takes up roughly the upper thirty percent of the display, the middle area 510 the next thirty percent, and the bottom area 360 the bottom forty percent. The top area 310 is located at the top of the display 500 and is unchanged from the top area 310 of display 300 in FIG. 4. Likewise, the bottom area 360 is located at the bottom of display 500, and is also unchanged from the bottom area 360 of display 300 in FIG. 4.

The middle display area 510, located between the top area 310 and the bottom area 360, contains a command section 330, and a content section 520. The command section 330, located at the top of display area 510, is unchanged from the command section 330 of display 300 in FIG. 4, and is as described above in the discussion of FIG. 4. A content section 520, located below the command section 330, contains the "City" input field 352 with the updated value of "Walldorf/Hessen", the result of the temporary communication area 410 from FIG. 5. As in display 300 in FIG. 4, the "City" input field 352 is located in the lower right corner of the middle display area 510 in the present display 500. The collection of business objects and field labels 356 occupy the remaining space in the content section 520. The business objects 356 are unchanged from the collection of business objects 356 from display 300 in FIG. 4, and are as described above in the discussion of FIG. 4.

Figure 7:
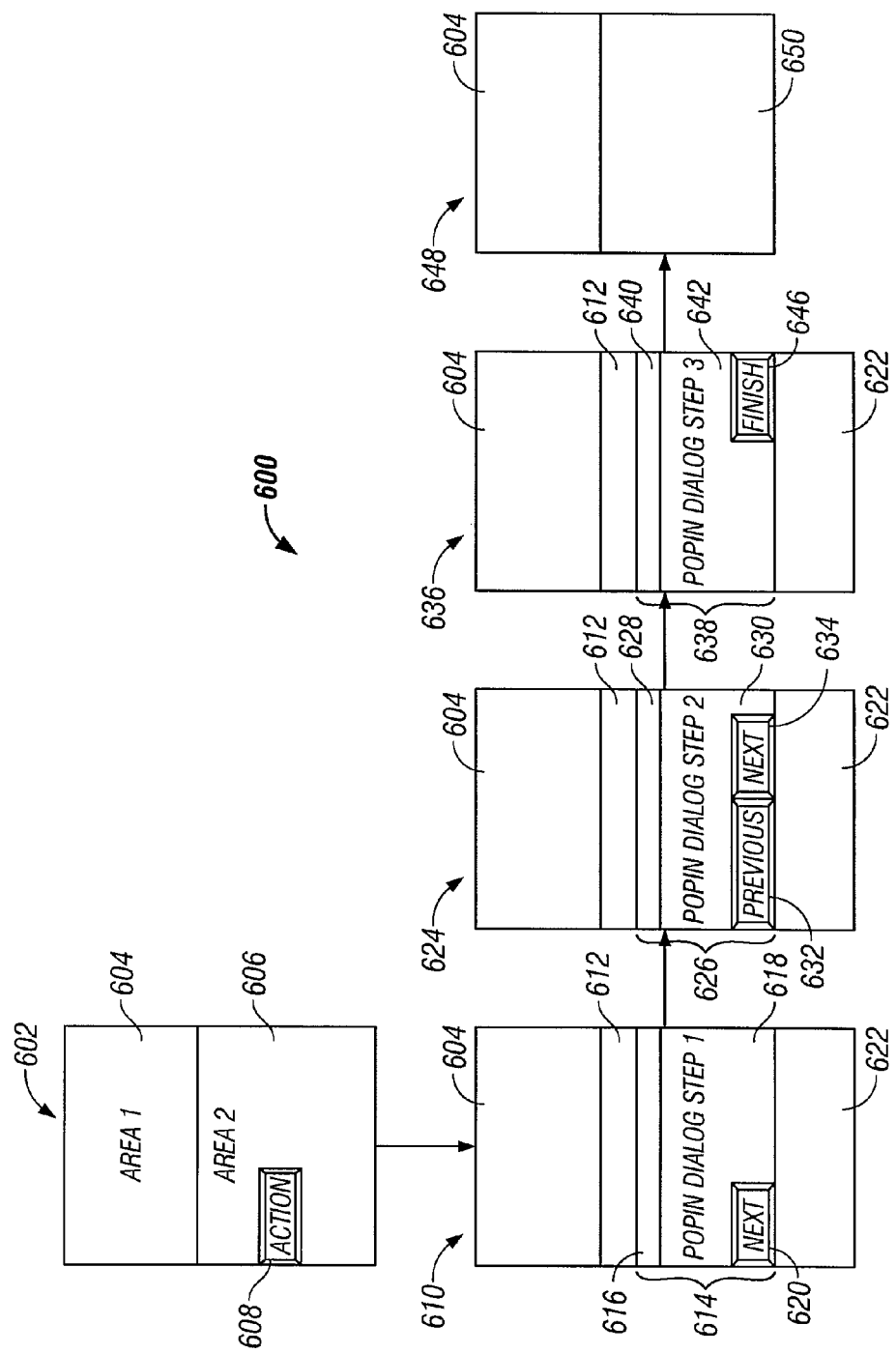
FIG. 7 is a conceptual diagram of another embodiment of the invention.

Another example of where a temporary communication area is useful is shown in FIG. 7. In this example, a sequence of inputs, in a defined order where successive inputs may depend on previously received inputs, is to be received from a user. In this situation, the pop-in window may change after each input or combination of inputs is received from the user, each time prompting the user to enter the next input or combination of inputs, until the entire sequence of inputs has been received.

FIG. 7 shows a conceptual diagram of a series of views 600 illustrating how a wizard (a structured series of dialogs that receive input from the user and use the input to produce a result) may be implemented using a pop-in window. The series of views 600 may be presented on screen 18 in FIG. 1 (where each view, successively displayed, takes up a portion of the screen 18 area) to a user of an application program. View 602, the initial view, shows two areas: Area 1 604 at the top of the view 602, and Area 2 606 located beneath Area 1 604. Area 2 606 contains a button 608 labeled "Action" that, when selected, launches a wizard, which appears in a pop-in window. Assume that the user selects the "Action" button 608. Next, view 610 would be displayed, containing the unchanged Area 1 604 from view 602, and a pop-in window 614, integrated into Area 2 between the upper section 612 of Area 2, and the lower section 622 of Area 2. The pop-in window 614 contains the first step of the wizard launched in response to the user selecting the "Action" button 608. Pop-in 614 contains a title bar 616, and a body area 618, conceptually labeled "PopIn Dialog Step 1", where the user would be prompted to enter an input (or inputs). A "Next" button 620, within the pop-in body area 618, causes the wizard to move to step 2 when selected.

Assume the user selects the "Next" 620 button. Subsequently, view 624 would be displayed, still containing the unchanged Area 1 604 from view 602, and a modified pop-in window 626. Pop-in 626, displayed between the upper section 612 of Area 2, and the lower section 622 of Area 2, contains the second (and middle, in this example) step of the wizard. Pop-in 626 contains a title bar 628, and a body area 630, conceptually labeled "PopIn Dialog Step 2", where the user would be prompted to enter another input (or inputs). A "Previous" button 632, located in the pop-in body area 630, causes the previous view 610 to be displayed again, when selected, permitting the user to modify previously entered inputs. A "Next" button 634, located right of the "Previous" button 632, causes the wizard to move to step 3 when selected.

Assume the user selects the "Next" 634 button. Thereafter, view 636 will be displayed. View 636 contains the unchanged Area 1 604 from view 602, and a further modified pop-in window 638. Pop-in 638, displayed between the upper and lower sections 612, 622 of Area 2, contains the final step of the wizard in this example. Pop-in 638 contains a title bar 640, and a body area 642, conceptually labeled "Popin Dialog Step 3", where the user may be prompted for the final input (or inputs). A "Finish" button 646, located in the pop-in body area 642, causes the pop-in window to complete its functionality and close the pop-in window 638 when selected. View 648 shows the resulting view containing the original Area 1 604 and a lower area 650 below area 604. Other embodiments may involve a different number of views in the series of views 600.

Figure 8:
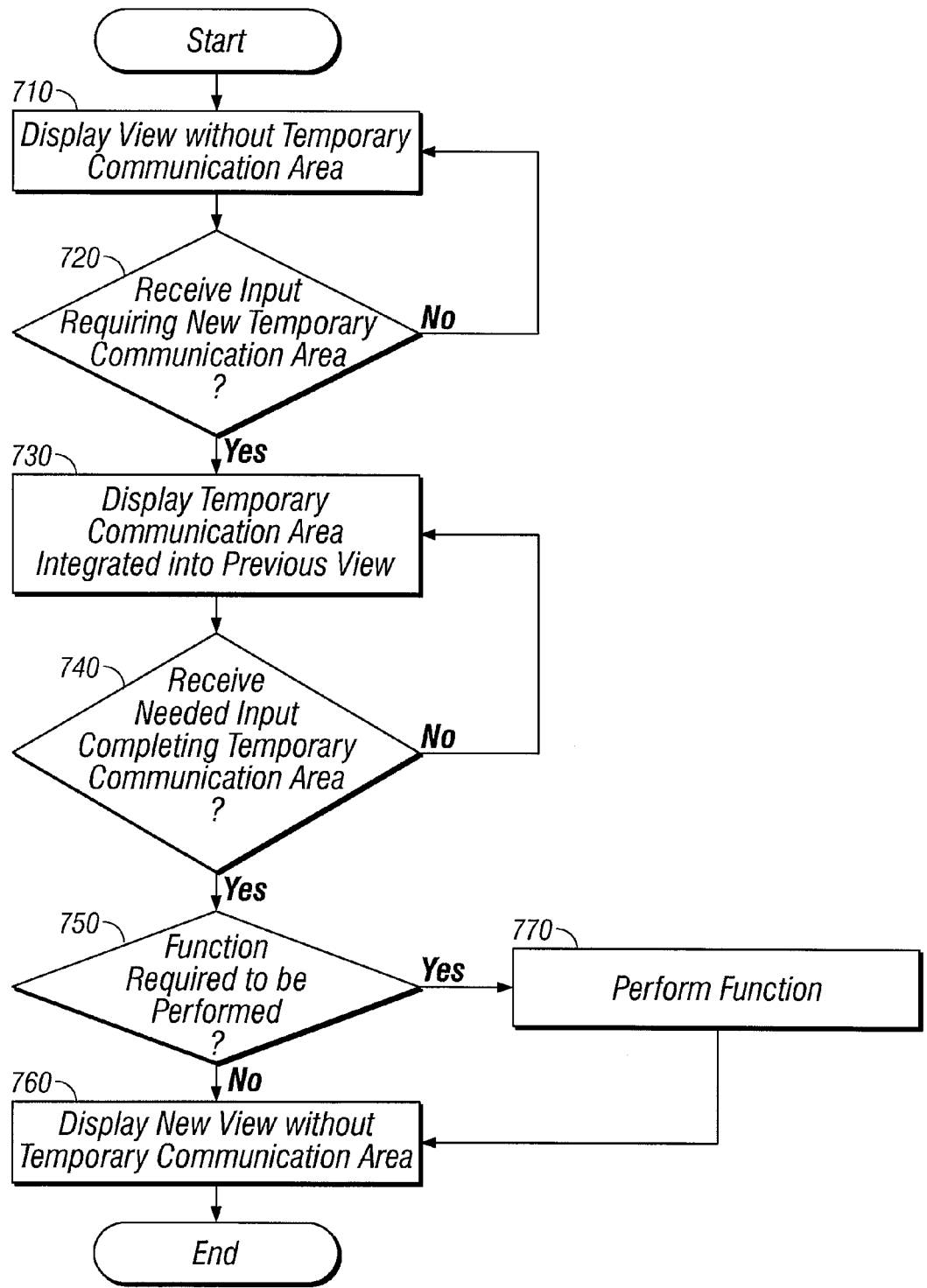
FIG. 8 is a flowchart illustrating how a user interface software application shown in FIG. 1 operates to produce the displays shown in FIGS. 2-6.

Referring to the flowchart of FIG. 8, the process performed by a processor executing instructions from a user interface program begins, at step 710, with the display of an initial view on screen 18 (FIG. 1). Examples of initial views are those shown in FIGS. 2 and 4. Next, the receipt of an input requiring that a new temporary communication area be displayed, at step 720, prompts the display of a temporary communication area integrated into the previous view in step 730. Examples of views with temporary communication areas are those shown in FIGS. 3 and 5. In the absence of such a received input, the view without the temporary communication area will continue to be displayed (step 710).

Examples of user inputs that may be received and necessitate the display of a temporary communication area might include the click of a mouse button, the typing of a key or sequence of keys on the keyboard, a voice-activated command input, the touch of a touchpad screen, etc., to give just a few examples. Displaying the temporary communication area may require resizing, reformatting, or repositioning one or more of the elements from the initial view. The temporary communication area may contain textual input fields, multiple-choice input fields, function buttons, message information, or any combination thereof.

Next, the receipt of an input or inputs completing the temporary communication area, at step 740, causes, at step 750, the decision on whether a function needs to be performed to be made. In the absence of the input to complete the temporary communication area, at step 740, the temporary communication area will continue to be displayed (step 730).

The determination that a function is required to be performed, at step 750, will prompt the function to be performed at step 770. Examples of such functions might include updating the value of a data field, sending an email, or saving changes made to an application, to give just a few examples. Next, a new view without a temporary communication area will be displayed at step 760, and the process ends.

If, at step 750, it was determined that a function need not be performed, a new view without a temporary communication area (step 760) will be displayed and the process ends. This might occur, for example, when the temporary communication area merely conveys a message to the user and the user's response acknowledges the message. As another example, the temporary communication area may have an input field or fields, function buttons, or any combination thereof available to the user, but the user chooses to close the temporary communication area by clicking on the close button without requesting that a function be performed. Examples of views without temporary communication areas are those shown in FIGS. 2 and 6.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for receiving input from a user, the method comprising:
   displaying a first view in a graphical user interface, the first view including a first input area located adjacent and non-overlapping a second input area;
   receiving, while the first view is displayed, an input from a user generated using at least one of the first and second input areas, wherein further input from the user is required for processing the input;
   displaying a second view in the graphical user interface in response to the input, the second view including the first and second input areas and a temporary communication area, the temporary communication area located adjacent and non-overlapping each of the first and second input areas and being accommodated by the second input area being relocated in its current shape away from the first input area;
   receiving the further input while the second view is displayed, the further input generated using an input control in the temporary communication area; and
   displaying a third view in the graphical user interface in response to the further input, wherein the temporary communication area is not included in the third view and the first input area is again located adjacent and non-overlapping the second input area.

2. The method of claim 1, wherein:
   the temporary communication area comprises a dialog box for creating an electronic communication to another user; and
   the processing of the input includes a transfer to another user of an electronic communication with attached information from a selected object from a list of database objects in the first view.

3. The method of claim 2, wherein the electronic communication transfer is an electronic mail message.

4. The method of claim 2, wherein the electronic communication transfer is a facsimile message sent from a computer.

5. The method of claim 1, further comprising:
   determining the input to be ambiguous and to correspond to a plurality of potential inputs;
   wherein the input control in the temporary communication area provides for making a selection of one of the plurality of potential inputs.

6. The method of claim 5, wherein the temporary communication area identifies the plurality of potential inputs to allow the user to select among the plurality of potential inputs.

7. The method of claim 6, wherein the plurality of potential inputs are identified in a drop-down list, enabling the user to choose among the plurality of potential inputs.

8. The method of claim 1, wherein the temporary communication area is a modal dialog box upon which the user is required to act before proceeding with another function relating to at least one of the first and second input areas.

9. A computer program product tangibly embodied in a non-transitory computer-readable storage medium and comprising instructions that when executed by a processor perform a method for receiving input from a user, the method comprising:
   displaying a first view in a graphical user interface, the first view including a first input area located adjacent and non-overlapping a second input area;
   receiving, while the first view is displayed, an input from a user generated using at least one of the first and second input areas, wherein further input from the user is required for processing the input;
   displaying a second view in the graphical user interface in response to the input, the second view including the first and second input areas and a temporary communication area, the temporary communication area located adjacent and non-overlapping each of the first and second input areas and being accommodated by the second input area being relocated in its current shape away from the first input area;
   receiving the further input while the second view is displayed, the further input generated using an input control in the temporary communication area; and
   displaying a third view in the graphical user interface in response to the further input, wherein the temporary communication area is not included in the third view and the first input area is again located adjacent and non-overlapping the second input area.

10. A method of receiving input from a user, the method comprising:
    arranging contents including a first input area adjacent and non-overlapping a second input area;
    receiving, while the contents are being displayed, an input from a user generated using at least one of the first and second input areas, wherein further input from the user is required for processing the input;
    rearranging the contents, in response to the input, including moving the second input area in its current shape away from the first input area to accommodate a temporary communication area located adjacent and non-overlapping each of the first and second input areas;
receiving the further input generated using an input control in the temporary communication area; and
rearranging the contents, in response to the further input, including removing the temporary communication area and moving the second input area so that the first input area is again located adjacent and non-overlapping the second input area.

* * * * *